US012573196B1

(12) United States Patent
Ebrahimi Afrouzi et al.

(10) Patent No.: US 12,573,196 B1
(45) Date of Patent: *Mar. 10, 2026

(54) METHODS FOR AN AUTONOMOUS ROBOTIC DEVICE TO IDENTIFY LOCATIONS CAPTURED IN AN IMAGE

(71) Applicants: Ali Ebrahimi Afrouzi, Henderson, NV (US); Sebastian Schweigert, Sunnyvale, CA (US); Chen Zhang, Redmond, WA (US); Hao Yuan, Fremont, CA (US)

(72) Inventors: Ali Ebrahimi Afrouzi, Henderson, NV (US); Sebastian Schweigert, Sunnyvale, CA (US); Chen Zhang, Redmond, WA (US); Hao Yuan, Fremont, CA (US)

(73) Assignee: AI Incorporated, Toronto (CA)

( * ) Notice: Subject to any disclaimer, the term of this patent is extended or adjusted under 35 U.S.C. 154(b) by 747 days.

This patent is subject to a terminal disclaimer.

(21) Appl. No.: 17/884,375

(22) Filed: Aug. 9, 2022

Related U.S. Application Data

(63) Continuation of application No. 17/021,175, filed on Sep. 15, 2020, now Pat. No. 11,443,508, which is a
(Continued)

(51) Int. Cl.
*G06V 20/10* (2022.01)
*A46B 3/00* (2006.01)
(Continued)

(52) U.S. Cl.
CPC ................ *G06V 20/10* (2022.01); *A46B 3/00* (2013.01); *A47L 9/0488* (2013.01); *A47L 9/281* (2013.01);
(Continued)

(58) Field of Classification Search
CPC .............. A47L 11/4011; A47L 11/4061; A47L 11/4063; A47L 2201/02; A47L 2201/022;
(Continued)

(56) References Cited

U.S. PATENT DOCUMENTS 9,914,217 B2 * 3/2018 Dooley ................ G05D 1/0219
9,973,694 B1 * 5/2018 Van Hoff ............. H04N 13/271
(Continued)

FOREIGN PATENT DOCUMENTS

CN 105279514 A * 1/2016 ........... B25J 9/1697
WO WO-2015131045 A1 * 9/2015 ......... H04N 5/23241

*Primary Examiner* — Nizar N Sivji

(57) ABSTRACT

Provided is a robot, including: a chassis; a plurality of sensors; a processor; and a tangible, non-transitory, machine-readable medium storing instructions that when executed by the processor effectuates operations including: receiving, with the processor, an image of an environment captured by a communication device separate from the robot; extracting, with the processor, objects and features captured in the image; determining, with the processor, an area within a map of the environment corresponding with an area captured in the image by comparing the objects and features captured in the image with objects and features within the map; and actuating, with the processor, the robot to navigate to the area captured in the image to perform work.

16 Claims, 4 Drawing Sheets

100 — Receiving an image of an environment from an applications of a communication device 101 — Obtaining raw pixel intensity values of the image 102 — Extracting objects in the image by grouping pixels with similar raw pixel intensity values 103 — Extracting features in the image by identifying areas in the image with greatest change in raw pixel intensity 104 — Determining an area within a map of the environment corresponding with the image by comparing objects and features of the image and map 105 — Inferring a location captured in the image based on the location of the area of the map corresponding with the image 106 — Instructing a robot to navigate to the location and execute a particular task

Related U.S. Application Data continuation of application No. 16/219,647, filed on Dec. 13, 2018, now Pat. No. 10,810,427.

(60) Provisional application No. 62/626,244, filed on Feb. 5, 2018, provisional application No. 62/620,053, filed on Jan. 22, 2018, provisional application No. 62/620,043, filed on Jan. 22, 2018, provisional application No. 62/599,459, filed on Dec. 15, 2017.

(51) Int. Cl.

| | |
|---|---|
| *A47L 9/04* | (2006.01) |
| *A47L 9/28* | (2006.01) |
| *A47L 11/24* | (2006.01) |
| *A47L 11/28* | (2006.01) |
| *A47L 11/40* | (2006.01) |
| *B25J 9/16* | (2006.01) |
| *G01C 21/00* | (2006.01) |
| *G05D 1/00* | (2024.01) |
| *G06T 7/187* | (2017.01) |
| *G06V 10/44* | (2022.01) |
| *G06V 10/75* | (2022.01) |
| *G06V 20/70* | (2022.01) |
| *G10L 15/22* | (2006.01) |

(52) U.S. Cl.

CPC ........... *A47L 9/2852* (2013.01); *A47L 9/2894* (2013.01); *A47L 11/24* (2013.01); *A47L 11/28* (2013.01); *A47L 11/4002* (2013.01); *A47L 11/4011* (2013.01); *A47L 11/4036* (2013.01); *A47L 11/4066* (2013.01); *B25J 9/1697* (2013.01); *G01C 21/3837* (2020.08); *G05D 1/0219* (2013.01); *G05D 1/0246* (2013.01); *G06T 7/187* (2017.01); *G06V 10/443* (2022.01); *G06V 10/751* (2022.01); *G06V 20/70* (2022.01); *G10L 15/22* (2013.01); *A46B 2200/3033* (2013.01); *A47L 2201/04* (2013.01); *G10L 2015/223* (2013.01)

(58) Field of Classification Search

CPC ......... A47L 2201/024; A47L 2201/028; A47L 2201/04; A47L 2201/06; A47L 9/0477; A47L 9/28; A47L 9/2826; A47L 9/2847; A47L 9/2852; A47L 9/2857; A47L 9/2873; A47L 9/2894; A47L 9/30; B25J 9/1676; B25J 9/1697; G01S 17/42; G01S 17/87; G01S 17/89; G01S 17/931; G01S 7/4804; G05D 1/242; G05D 1/2435; G05D 1/245; G05D 1/2464; G05D 1/249; G05D 1/617; G05D 1/622; G05D 1/644; G05D 1/6485; G05D 1/661; G05D 2105/10; G05D 2105/87; G05D 2109/10; G05D 2111/17; G05D 2111/54; G06V 10/82; G06V 20/58; G06V 40/28

See application file for complete search history.

(56) References Cited

U.S. PATENT DOCUMENTS

| | | | | |
|---|---|---|---|---|
| 10,427,306 | B1 * | 10/2019 | Quinlan | .................. G06F 3/016 |
| 10,452,071 | B1 * | 10/2019 | Ebrahimi Afrouzi | ........................ B25J 9/1676 |
| 10,471,611 | B2 * | 11/2019 | Dooley | .................. H04N 7/185 |
| 10,496,104 | B1 * | 12/2019 | Liu | ........................... G06T 5/73 |
| 11,348,269 | B1 * | 5/2022 | Ebrahimi Afrouzi | ... G01S 17/48 |
| 2006/0095158 | A1 * | 5/2006 | Lee | ................... H04M 1/72415 318/568.12 |
| 2007/0100780 | A1 * | 5/2007 | Fleischer | ........... G06K 9/00664 706/15 |
| 2014/0207282 | A1 * | 7/2014 | Angle | .................... B25J 13/006 901/1 |
| 2015/0065803 | A1 * | 3/2015 | Douglas | .................. G06T 7/143 600/200 |
| 2015/0212521 | A1 * | 7/2015 | Pack | .................... G05D 1/0274 701/28 |
| 2016/0175964 | A1 * | 6/2016 | Penoyer | ............... B23K 9/0956 219/137 R |
| 2017/0197311 | A1 * | 7/2017 | Garcia | .................. G01S 15/931 |
| 2017/0203446 | A1 * | 7/2017 | Dooley | ............... H04N 23/631 |
| 2017/0358099 | A1 * | 12/2017 | Harris | ....................... G06T 7/55 |
| 2018/0131856 | A1 * | 5/2018 | Sato | .................... G05D 1/0231 |
| 2018/0322646 | A1 * | 11/2018 | Matthies | ............... B64C 39/024 |
| 2018/0344116 | A1 * | 12/2018 | Schriesheim | ........ G05D 1/0016 |
| 2018/0348783 | A1 * | 12/2018 | Pitzer | .................. G05D 1/0214 |
| 2019/0019030 | A1 * | 1/2019 | Cansizoglu | ............. G06F 18/23 |
| 2019/0197774 | A1 * | 6/2019 | Molyneaux | ........... G06T 7/0002 |
| 2020/0047337 | A1 * | 2/2020 | Williams | ............... B25J 9/1676 |
| 2021/0157312 | A1 * | 5/2021 | Cella | .................. G01M 13/045 |

* cited by examiner

FIG. 1

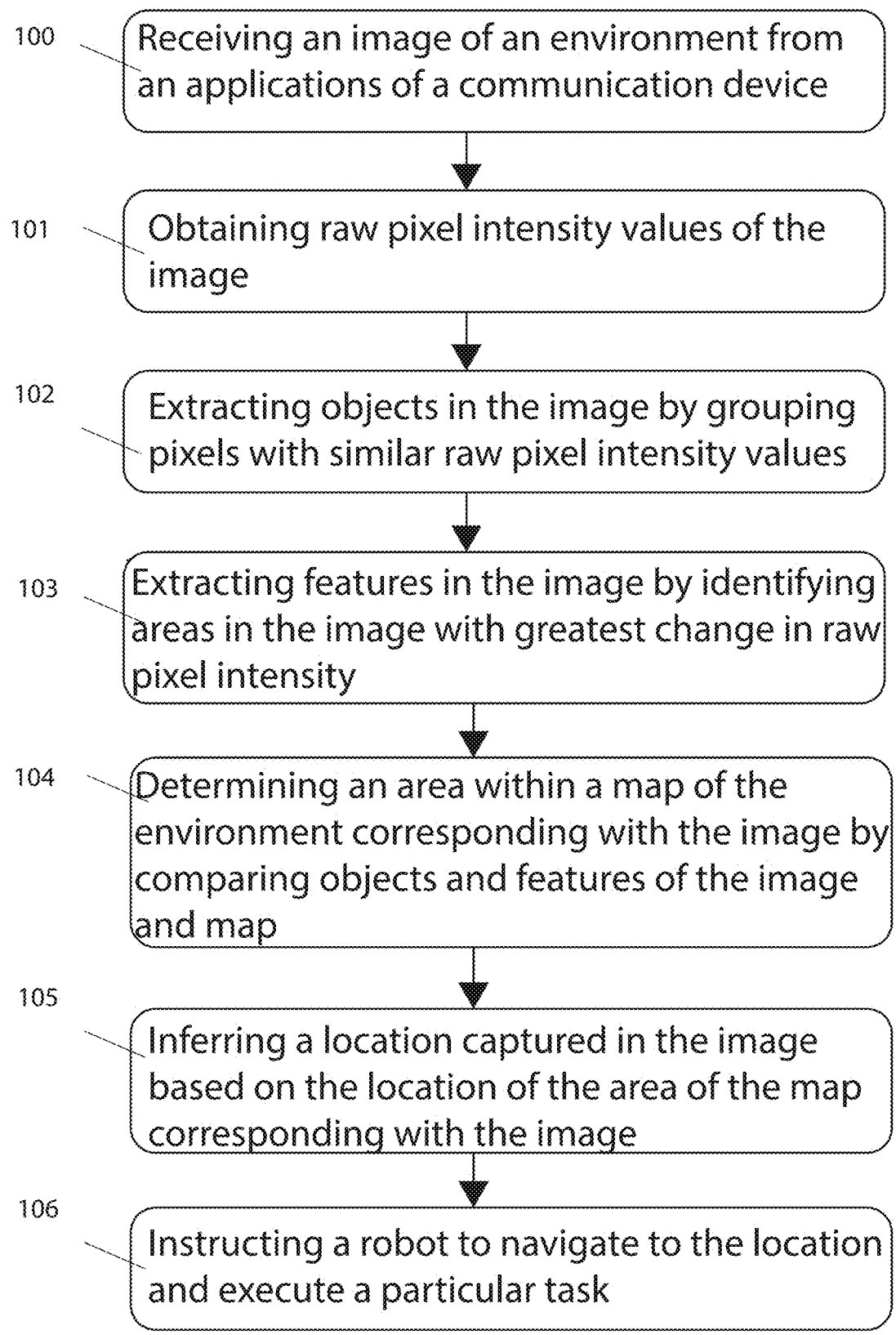

100   Receiving an image of an environment from an applications of a communication device 101   Obtaining raw pixel intensity values of the image 102   Extracting objects in the image by grouping pixels with similar raw pixel intensity values 103   Extracting features in the image by identifying areas in the image with greatest change in raw pixel intensity 104   Determining an area within a map of the environment corresponding with the image by comparing objects and features of the image and map 105   Inferring a location captured in the image based on the location of the area of the map corresponding with the image 106   Instructing a robot to navigate to the location and execute a particular task

METHODS FOR AN AUTONOMOUS ROBOTIC DEVICE TO IDENTIFY LOCATIONS CAPTURED IN AN IMAGE

CROSS-REFERENCE TO RELATED APPLICATIONS

This application is a Continuation of U.S. Non-Provisional patent application Ser. No. 17/021,175, filed Sep. 15, 2020, which is a Continuation of U.S. Non-Provisional patent application Ser. No. 16/219,647, filed Dec. 13, 2018, which claims the benefit of U.S. Provisional Patent Application Nos. 62/599,459, filed Dec. 15, 2017, 62/620,043 filed Jan. 22, 2018, 62/620,053, filed Jan. 22, 2018, and 62/626,244 filed Feb. 5, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 62/681,965, 62/614,449, 16/109,617, 16/041,286, 15/406,890, 14/673,633, 16/163,530, 62/613,005, 62/616,928, 15/614,284, 14/817,952, 62/666,266, and 62/590,205 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to mobile robotic devices and more particularly to navigation of mobile robotic devices.

BACKGROUND

Mobile robotic devices are increasingly used to automate tasks within an environment. In some instances, the tasks executed by a mobile robotic device are executed in all areas of the environment. However, in some cases, the execution a task in a particular location may be required. In such instances, a mobile robotic device executes a task in a particular location by, for example, physically directing the mobile robotic device to the particular location or by using a remote control to drive the mobile robotic device to the particular location.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a robot, including: a chassis; a plurality of sensors; a processor; and a tangible, non-transitory, machine-readable medium storing instructions that when executed by the processor effectuates operations including: receiving, with the processor, an image of an environment captured by a communication device separate from the robot; extracting, with the processor, objects and features captured in the image; determining, with the processor, an area within a map of the environment corresponding with an area captured in the image by comparing the objects and features captured in the image with objects and features within the map; and actuating, with the processor, the robot to navigate to the area captured in the image to perform work.

Some aspects provide a system including an application of a communication device paired with a robot, configured to: display an image; a label associated with at least a portion of content captured in the image; a status of the robot; a map of an environment of the robot; and debris within the map; and receive at least one input designating an action of the robot related to the at least the portion of the content captured in the image; a schedule of the robot; a modification to the map; at least one robot setting; a subarea within the map of the environment that the robot is to avoid; and a label of a subarea within the map of the environment; and a robot, including: a chassis; a plurality of sensors; a processor; and a tangible, non-transitory, machine-readable medium storing instructions that when executed by the processor effectuates operations including: capturing, with an image sensor disposed on the robot, a plurality of images; generating, with the processor, the map of the environment based on at least the plurality of images; extracting, with the processor, at least one object captured in the plurality of images; and actuating, with the processor, the robot to execute the action of the robot related to the at least the portion of the content captured in the image Some aspects provide a tangible, non-transitory, machine-readable medium storing instructions that when executed by a processor of a robot effectuates operations including: capturing, with an image sensor disposed on the robot, a plurality of images; generating, with the processor, a map of an environment of the robot based on at least the plurality of images; and extracting, with the processor, at least one object captured in the plurality of images; pairing, with the processor, an application of a communication device with the robot, wherein the application is configured to: display an image; a label associated with at least a portion of content captured in the image; a status of the robot; a map of an environment of the robot; and debris within the map; and receive at least one input designating an action of the robot related to the at least the portion of the content captured in the image; a schedule of the robot; a modification to the map; at least one robot setting; a subarea within the map of the environment that the robot is to avoid; and a label of a subarea within the map of the environment; and actuating, with the processor, the robot to execute the action of the robot related to the at least the portion of the content captured in the image Some aspects include a method for operating a robot, including: capturing, with an image sensor disposed on the robot, a plurality of images; generating, with a processor of the robot, a map of an environment of the robot based on at least the plurality of images; and extracting, with the processor, at least one object captured in the plurality of images; pairing, with the processor, an application of a communication device with the robot, wherein the application is configured to: display an image; a label associated with at least a portion of content captured in the image; a status of the robot; a map of an environment of the robot; and debris within the map; and receive at least one input designating an action of the robot related to the at least the portion of the content captured in the image; a schedule of the robot; a modification to the map; at least one robot setting; a subarea within the map of the environment that the robot is to avoid; and a label of a subarea within the map of the environment; and actuating, with the processor, the robot to execute the action of the robot related to the at least the portion of the content captured in the image.

BRIEF DESCRIPTION OF THE DRAWINGS

FIG. 1 illustrates a flowchart describing an example of a method for identifying a location captured in an image within a map of the environment in some embodiments.

DETAILED DESCRIPTION OF SOME EMBODIMENTS

Figures 2A, 2B, 2C:
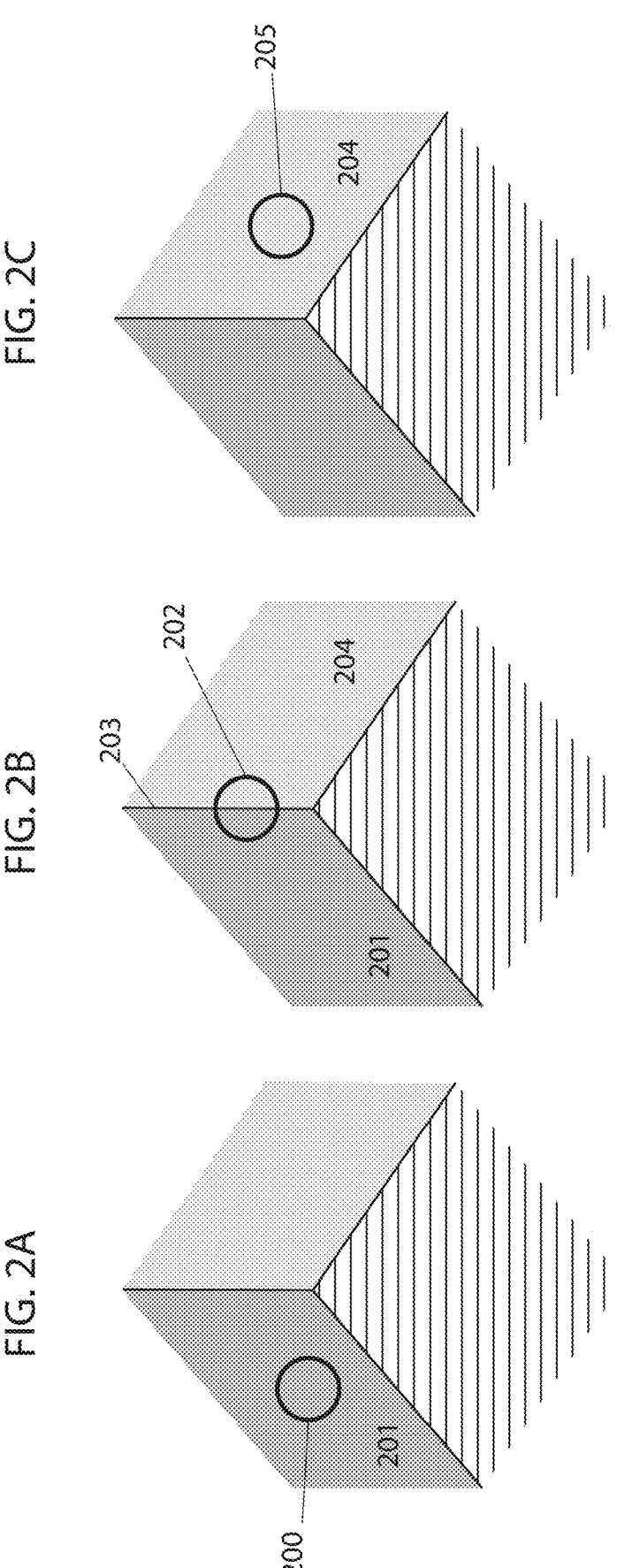
FIG. 2A-2F illustrate an embodiment of a camera detecting a corner in some embodiments.

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade offs may warrant systems that only afford a subset of the benefits described herein or that will be apparent to one of ordinary skill in the art.

Some embodiments provide an application of a communication device paired with a robotic device. Examples of a communication device include a smartphone, a tablet, a laptop, a remote, and other communication devices capable of communicating information with the robotic device. In some embodiments, the application of the communication device accesses the camera of the communication device to capture images of the environment. In some embodiments, the camera of the communication device captures images of the environment and the application of the communication device accesses the previously captured images and uploads them. In some embodiments, the application of the communication device wirelessly transmits the images to a processor of the robotic device. In some embodiments, the processor identifies the locations captured in the images within a map of the environment by identifying similarities in features in the captured images and in the map of the environment. In some embodiments, the processor instructs the robotic device to navigate and/or service the locations identified in the captured images.

In some embodiments, the time or type of service for the locations captured in the images are specified using the application of the communication device and transmitted to the processor of the robotic device such that the processor instructs the robotic device to service the locations captured in the images at the specified time or using the specified service type (e.g., mopping, vacuuming, UV sterilization, etc.). In some embodiments, the processor of the robotic device instructs the robotic device to service the locations captured in the images immediately upon receiving images from the application of the communication device. In some embodiments, the order of service for the locations captured in the images are specified using the application of the communication device and transmitted to the processor of the robotic device such that the processor instructs the robotic device to service the locations captured in the images in the particular order specified. In some embodiments, the processor of the robotic device autonomously determines the order of service of the locations captured in the images using methods such as those described in U.S. patents application Ser. Nos. 14/817,952, 62/666,266, and 62/590,205, the entire contents of which are hereby incorporated by reference. In some embodiments, the path of the robotic device is specified using the application of the communication device and transmitted to the processor of the robotic device such that the processor instructs the robotic device to service the locations captured in the images by following along the specified path.

In some embodiments, the processor of the robotic device autonomously determines the path of the robotic device using methods such as those described in U.S. patent application Ser. Nos. 16/041,286, 15/406,890, 14/673,633, and 16/163,530, the entire contents of which are hereby incorporated by reference. For example, some of the embodiments provide an autonomous robotic cleaning device with at least one processor and a debris sensor. In some embodiments, the debris sensor detects the amount of debris collected. In some embodiments, the processor uses the data from the debris sensor of the robotic cleaning device to determine which areas of an environment have a higher likelihood of accumulating debris. In some embodiments, the processor associates a location of the robotic device with each reading of the debris sensor to determine to which area of the environment the data belongs. In some embodiments, the debris sensor has its own processor and associates a location of the robotic device with each reading of the debris sensor. In some embodiments, other information is associated with each debris sensor reading, such as date, time and type of debris (e.g., hair, food, dust, etc.). In some embodiments, associates information to only a portion of the sensor readings. In some embodiments, the processor instructs the robotic cleaning device to perform cleaning in areas with higher levels of debris accumulation more frequently. In some embodiments, the frequency is proportional to the level of debris accumulation. In some embodiments, the processor stores all or a portion of the debris sensor data and all or a portion of any other data associated with the debris sensor data in a memory of the robotic device. In some embodiments, the processor uses the stored data for optimizing cleaning of the environment by performing cleaning functions according to the needs of different areas.

In some embodiments, the debris sensor is coupled to one of the processors of the robotic device and the processor of the robotic device processes the sensor data. In other embodiments, the debris sensor includes its own processor for processing the sensor data. In some embodiments, the debris sensor approximates the amount of debris collected (e.g., over time or over an area) and the processor uses the data to estimate levels of debris accumulation for different areas of the environment. In some embodiments, optical sensors (like light sensors, laser sensors, and IR sensors) and/or capacitive sensors and/or acoustic sensors and/or weight sensor and/or piezoelectric sensors may be used for detecting debris, estimating the amount of debris collected (e.g., over time or over an area) and/or the type of debris collected. In some embodiments, the processor of the robotic device monitors a signal intensity received from a capacitance sensor to detect when debris is collected, approximate the amount of debris collected (e.g. over time or over an area) and/or determine the type of debris collected (e.g., liquid, solid food, etc.). In other embodiments, the processor monitors the amount of light received by a light emitting optical sensor placed at a debris intake area of the robotic device to detect when debris is collected, approximate the amount of debris collected (e.g. over time or over an area) and/or determine the type of debris collected (e.g., liquid, solid food, etc.) as the amount of light received reduces with increasing amount of debris blocking the light. In other cases, the processor uses data from an IR proximity sensor aimed at the surface as different surfaces (e.g. clean hardwood floor, dirty hardwood floor with thick layer of dust) have different reflectance thereby producing different signal output. In some instances, the processor uses data from a weight sensor of a dustbin to detect debris and estimate the amount of debris collected. In other instances, the processor uses data from an acoustic sensor to detect debris and/or determine the type of debris. For example, the processor differentiates between the acoustic signal of large solid particles, small solid particles or air to determine the type of debris and based on the duration of different acoustic signals identifies areas with greater amount of debris accumulation. In some instances, a piezoelectric sensor is placed within a debris intake area of the robotic device such that debris may make contact with the sensor. The processor uses the piezoelectric sensor data to detect the amount of debris collected and type of debris based on the magnitude and duration of force measured by the sensor. In some embodiments, a camera captures images of a debris intake area of the robotic vacuum and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected.

In some embodiments, a memory of the robotic device contains an internal database of types of debris likely to be encountered within the environment. In some embodiments, the processor identifies the type of debris collected in the environment by using the data of various sensors capturing the features of the debris (e.g., camera, pressure sensor, acoustic sensor, etc.) and comparing those features with features of different types of debris stored in the internal database. In some embodiments, the processor of the robotic device determines the likelihood of collecting a particular type of debris in different areas of the environment based on, for example, current and historical data. For example, a robotic device encounters accumulated dog hair on the surface. Image sensors of the robotic device capture images of the debris and the processor analyzes the images to determine features of the debris. The processor compares the features to those of different types of debris within the internal database and matches them to dog hair. The processor of the robotic device marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered can be cleaned by a cleaning function of the robotic device. For example, a processor of a robotic vacuum determines that the debris encountered is a liquid and that the robotic device does not have the capabilities of cleaning the debris. In some embodiments, the processor of the robotic device incapable of cleaning the particular type of debris identified communicates with, for example, a control system or another robotic device capable of cleaning the debris from the environment.

In embodiments, the processor of the robotic device marks the level of debris accumulation expected in different areas of the environment within a map of the environment based on, for example, current and historical data (e.g. sensor data, cleaning history, etc.). In some embodiments, the processor adjusts the level of debris marked within different areas of the map of the environment based on historical data on debris accumulation in that particular areas and/or cleaning history of particular areas (e.g., last time an area was cleaned). In some embodiments, the processor of the robotic device marks the type of debris expected in different areas of the environment within a map of the environment based on, for example, current and historical data (e.g. sensor data, cleaning history, etc.). In some embodiments, the processor determines the likelihood of an area having different levels of debris accumulation (e.g., likelihood of a particular area having low, medium and high debris accumulation). In some embodiments, the likelihood is adjusted based on cleaning history. For example, if an area with high likelihood of having a high level of debris accumulation was just cleaned, the processor reduces the likelihood of having a high level of debris accumulation and increases the likelihood of having a low level of debris accumulation.

In some embodiments, the processor of the robotic device stores all or a portion of the data relating to debris accumulation collected and/or processed by the processor of the robotic device or processor of other robotic devices operating within the same environment in the memory of the robotic device. In some embodiments, the processor of the robotic device determines a path and/or the order of areas to be cleaned and/or cleaning schedule and/or other instructions of the robotic device based on the estimated levels of debris accumulation in different areas of the environment determined from all or a portion of the data relating to debris accumulation. For example, the processor determines a cleaning path that provides prioritization to areas with high debris accumulation. For instance, the processor of the robotic device prioritizes cleaning a kitchen over a sitting room when planning a cleaning session and navigational route if data suggests that food particles are routinely encountered in the kitchen while the sitting room routinely has a low level of debris accumulation. This improves cleaning efficiency as areas with high levels of debris accumulation are identified and prioritized for cleaning over those with low levels of debris accumulation. In some embodiments, the processor prioritizes areas based on the type of debris. For example, the processor of the robotic device prioritizes cleaning a kitchen with high level of debris accumulation, the debris type being food, over a sitting room with high level of debris accumulation, the debris type being dust. It is more important that larger, visible, unsanitary debris be cleaned prior to smaller, invisible debris.

In some embodiments, the processor or a user sets a cleaning schedule for the robotic device. In instances wherein the cleaning time of the robotic device is limited, the processor of the robotic device prioritizes cleaning areas with higher levels of accumulated debris. For example, the processor prioritizes highly used areas such as, the kitchen, bathroom, and bedrooms, with high levels of daily debris accumulation before cleaning other rooms with lower levels of debris accumulation. In some embodiments, the processor of the robotic device determines the cleaning schedule based on the level of dust accumulation in different areas of the environment. For example, the processor of the robotic device schedules daily cleaning of the kitchen, bathrooms, and bedrooms, with high levels of dust accumulation, while scheduling cleaning of other rooms once a week. In some embodiments, the processor of the robotic device marks areas it has cleaned during each cleaning session. In some instances, the processor stores other information, such as, cleaning time, repeat coverage, date and time of cleaning an area, the number of times an area is cleaned, and the like, in the memory of the robotic device. In some embodiments, the processor uses such information to adjust the estimated level of dust accumulation or likelihood of different levels of dust accumulation in a particular area of the environment.

In some embodiments, the processor of the robotic device alters the function of the robotic device based on the estimated level of dust accumulation or likelihood of different levels of dust accumulation in different areas of the environment. For example, the processor of the robotic device increases the speed of the robotic device in areas likely to have no or low levels of debris accumulation while decreasing the speed in areas likely to have high levels of debris accumulation to more carefully clean the area. In another example, the processor of the robotic device increases the speed of the impeller or main brush of the robotic device in areas likely to have no or low levels of debris accumulation while decreasing the speed of the impellor or main brush in areas likely to have high levels of debris accumulation to more thoroughly clean the area.

In some embodiments, the levels of debris accumulation referred to are expected levels of debris accumulation based on current and historical data (e.g., debris sensor data, image sensor data, obstacle sensor data, movement sensor data, cleaning data, etc.). In some embodiments, each level is assigned a likelihood of being true for different areas within the environment. In some embodiments, the levels are categories while in other embodiments, the level of dust accumulation is an exact number or is assigned to a numerical range.

In some embodiments, the processor of the robotic device generates a map of the environment. In some embodiments, the processor of the robotic device generates a new map at each cleaning session. In some embodiments, the processor compiles maps generated during prior cleaning sessions. In some embodiments, the compiled map generates a comprehensive map of all the maps previously generated. In some embodiments, the map contains data relating to the environment. In some embodiments, the map includes information such as, likelihood of different levels of dust accumulation in different locations of the environment, the likelihood of encountering different types of debris in different locations of the environment, the frequency of encountering a particular level of debris accumulation and/or type of debris in different locations, and the date and/or time of encountering a particular level of debris accumulation and/or type of debris in different locations. In some embodiments, the processor uses the information in generating the cleaning path of the robotic device.

In some embodiments, the map of the environment is a grid map wherein the map is divided into cells, each cell representing a different area or location within the environment. In some embodiments, the debris sensor collects data as the robotic device navigates throughout the environment or operates within the environment. In some embodiments, the processor associates each or a portion of the debris sensor readings with the particular cell (or location) of the robotic device when the particular reading was taken. In some embodiments, the robotic device continues to cover the surface of the environment until data from the debris sensor is collected for each or a select number of cells of the grid map. In some embodiments, the processor associates debris data obtained from a control system or another robotic device with all or a portion of the cells of the grid map. In some embodiments, the debris sensor data associated with cells of the grid map indicate the presence or absence of debris within the particular cell while in other embodiments, the debris sensor data associated with cells of the grid map indicate a level of debris accumulation as described above. In some embodiments, the processor associates additional information with cells of the grid map. For example, for a single debris sensor reading of a cell, additional information such as, date and time of the debris reading, the amount of debris collected, the size of debris collected, the type of debris collected, and the like, may be associated with the cell as well. Further, in some instances, information such as, the likelihood of the cell having a particular level of dust accumulation, type of debris, and/or size of debris, is associated with cells of the grid map.

In some embodiments, the processor of the robotic device generates a new grid map with a new debris-related information associated with each or a portion of the cells of the grid map at each work session. In some embodiments, the processor compiles the map generated at the end of a work session with an aggregate map comprised of a combination of maps generated during each or a portion of prior work sessions. In some embodiments, the processor directly integrates data collected during a work session into the aggregate map either after the work session or in real-time as data is collected. In some embodiments, the likelihood of different levels of debris accumulation and/or encountering a particular type and/or size of debris associated with a cell of the aggregate map is based on debris sensor data or other data collected during prior work sessions. In some embodiments, the processor updates the aggregate map after each work session. In some embodiments, information pertaining to, for example, obstacles, work surface types, hazards, and the like are associated with cells of the map.

In some embodiments, the processor of the robotic device uses information from the aggregate map when determining a cleaning path and/or work functions (or actions) and/or settings of the robotic device. Work functions (or actions) may include, but are not limited to, vacuuming, sweeping, mopping, UV treatment, etc. Settings may include, but are not limited to, speed of the robotic device, speed of brushes, speed of impeller, cleaning schedule, cleaning plan (e.g., which areas to clean), etc. For example, the processor of the robotic device determines the cleaning path based on debris accumulation data of the aggregate map such that the cleaning path first covers areas with high likelihood of high levels of debris accumulation, then covers areas with high likelihood of low levels of debris accumulation. In another example, the processor of the robotic device determines the impeller speed based on debris size data of the aggregate map such that higher impeller speeds are used in areas with high likelihood of large sized debris and lower speeds are used in areas with high likelihood of small sized debris. In another example, the processor of the robotic devices chooses when to use UV treatment based on debris type data of the aggregate map such that areas with high likelihood of having debris that can cause sanitary issues, such as food, receive UV treatment. In some embodiments, the processor of the robotic device considers additional factors when determining a cleaning path and/or work functions (or actions) and/or settings of the robotic device. For example, factors relating to obstacles or hazards in the environment, user preferences, work surface type, cleaning history, and the like may be considered. For instance, the processor of the robotic device increases the speed of the robotic device on hard wood floor or increases the speed of the impeller on carpet.

In some embodiments, the robotic device is a robotic cleaner and comprises a main brush and a peripheral brush. In some embodiments, the peripheral brush of the robotic cleaner includes one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction.

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms.

In some embodiments, the application of the communication device is used to label locations captured in the images. In some embodiments, icons of common types of rooms are placed over corresponding locations in a captured image to label the locations as such. For example, locations captured in images can be labelled as, kitchen, bathroom, bedroom, office, etc. In some embodiments, the application of the communication device labels the locations captured in the images using a default naming structure such as, region 1, region 2, region 3, etc. In some embodiments, instructions for servicing locations of the environment are specified using the labels of different locations. In some embodiments, the processor labels locations captured in the images. In some embodiments, wherein multiple locations within an environment are captured in a single image, one or more locations within the captured image are selected using the application of the communication device. In some embodiments, the processor labels the corresponding locations in the map of the environment with the same name. In some embodiments, the processor identifies locations by their labelled names until they are changed. For example, the processor accepts voice commands for different locations of the environment using their labelled names.

In some embodiments, captured images are edited using tools (e.g., drawing tools) of the application of the communication device. In some embodiments, modifications to the captured images are used to indicate a particular action of the robotic device. For example, different locations captured in an image can be color coded using tools of the application of the communication device, wherein each color indicates a different action of the robotic device (e.g., mopping, vacuuming, UV sterilization, restricted area, high or low suction, fast or slow robot speed, frequency of service, etc.). In some embodiments, different colors can also have different meanings (e.g., real or virtual boundary, level of debris accumulation, floor type, obstacle, door, etc.). For example, a red line drawn on an image is indicative of a boundary of the environment or a blue circle drawn on an image is indicative of a location with high levels of debris accumulation. In some embodiments, the processor uses boundaries drawn on captured images to update its map of the environment. In some embodiments, the processor completes a drawn boundary line if a gap between two adjacent aligned lines is less than a predetermined threshold. For example, the processor extends a yellow line drawn across a doorway indicating a virtual boundary such that it connects with the adjacent aligned wall to close a small gap (e.g., <10% the width of the doorway opening) between the drawn line and the wall. In other embodiments, different shapes or patterns correspond with different actions of the robotic device or different meanings. For instance, a diamond drawn over the locations in the captured images indicates the use of high suction during operation in those areas while a square drawn over the locations in the captured images indicates the use of low suction during operation in those area. In some embodiments, the application of the communication device determines the action or meaning corresponding with each color, shape and/or pattern and in other embodiments, the action or meaning corresponding with each color, shape and/or pattern is chosen using the application of the communication device.

In some embodiments, a graphical user interface, such as those described in U.S. patent application Ser. Nos. 15/272,752 and 15/949,708, the entire contents of which is hereby incorporated by reference, is used for launching the camera of the communication device to capture images, uploading images, selecting locations within images, editing images, labelling locations of the environment in images or a map, choosing or modifying robotic device settings, providing instructions to the robotic device, monitoring the status of the robotic device, setting a schedule of the robotic device, choosing or modifying a path of the robotic device, choosing or modifying areas of an environment, choosing or modifying the order of servicing areas, viewing and editing a map of the environment, transmitting information to and from the robotic device, and performing other actions related to the robotic device.

In some embodiments, the application of the communication device stitches multiple consecutive images together to create a larger image. In some embodiments, the camera captures a panoramic image. In some embodiments, wherein multiple locations within an environment are captured in a single image, one or more locations within the captured image are selected using the application of the communication device.

In some embodiments, a finger, a stylus, a pen, a cursor, a pointer, a mouse, a button or buttons, or a keyboard are used to interact with the graphical user interface of the application of the communication device.

In some embodiments, the processor uses pixel color intensity to extract different objects (e.g., floor, wall, furniture) and features in the captured images (e.g., boundaries between objects, edges, corners, shapes, color, etc.). In some embodiments, the processor matches features in the captured images with those in a map of the environment to determine the locations captured in the images. In some embodiments, the processor of the robotic device instructs the robotic device to navigate to and/or service the locations captured in the images. In some embodiments, the instructions provided to the robotic device with respect to the locations captured in the images are chosen using the application of the communication device and transmitted to the processor of the robotic device.

In some embodiments, the processor extracts objects (e.g., floor, walls, furniture, etc.) captured in an image using pixel vectors (r,g,b) of the pixels in the captured image. In some embodiments, the processor applies a thresholding method to identify different objects captured within the image as different objects have different ranges of pixel color intensities. For example, the processor can separate a white wall captured in an image having a high range of pixel color intensities from a dark colored hardwood floor having low range of pixel color intensities by thresholding. In some embodiments, the processor assigns all pixels with pixel color intensities below a certain threshold a pixel color intensity value of zero and all pixels with pixel color intensities above the threshold a pixel color intensity value of 255. In some embodiments, the processor discards or segments all pixels with pixel color intensities below a certain threshold, leaving only the pixels of interest. In some embodiments, the processor extracts objects and features in the captured image by grouping pixels of the captured image by pixel color intensity values r, g, and b. For example, if pixel vectors (r,g,b) are represented in a three-dimensional color space, all pixels having the same r value will form a plane, all pixels having the same r and g values will form a line, and all pixels having the same r, g, and b values will form a point. In a map of the environment, pixels with similar colors are positioned close to one another and in some embodiments, the group of pixels with similar colors collectively form an object captured in the image.

Some embodiments implement density-based spatial clustering of applications with noise (DB-SCAN) on pixel color intensity r, g, and b of pixels of the captured image to determine a plurality of clusters, each corresponding to pixels of the same feature of an object. Some embodiments execute a density-based clustering algorithm, like DB-SCAN, to establish groups corresponding to the resulting clusters and exclude outliers. To cluster according to pixel color intensity of pixels, some embodiments iterate through each of the pixel vectors (r,g,b) of the pixels and designate a pixel vector as a core pixel vector if at least a threshold number of the other pixel vectors are within a threshold distance in the vector space. Some embodiments then iterate through each of the core pixel vectors and create a graph of reachable pixel vectors. In such embodiments, nodes on the graph are identified in response to non-core corresponding pixel vectors within a threshold distance of a core pixel vector on the graph and in response to core pixel vectors on the graph being reachable by other core pixel vectors on the graph. Two pixel vectors are reachable from one another if there is a path from one pixel vector to the other pixel vector, where every link and the path is a core pixel vector and within a threshold distance of one another. The set of nodes in each resulting graph, in some embodiments, are designated as a cluster, and points excluded from the graphs are designated as outliers that do not correspond to clusters. In some embodiments, the processor then determines the centroid of each cluster in the spatial dimensions of the pixel vectors.

In some embodiments, the processor identifies objects and features in the captured image based on the change in pixel color intensity between adjacent pixels. For instance, the processor identifies objects and features by observing a sudden increase then decrease in pixel color intensity or an increase in pixel color intensity followed by constant pixel color intensity or constant pixel intensity followed by a decrease in pixel intensity or by observing other patterns in pixel color intensity. For example, the processor identifies edges and corners in a captured image by determining the change in pixel color intensity between adjacent pixels of the image. In some embodiments, the processor determines change in pixel color intensity of pixels in a first area of the image bounded within a window of predetermined size. If insignificant changes in pixel color intensity are observed in the first area, the processor moves the window in any direction (e.g., horizontal, vertical, etc.) to observe pixels in another area of the image until an area having significant changes in pixel intensity is observed. If significant changes in pixel intensity are observed in the first area, the processor moves the window in a horizontal direction (or in other instances another direction) to observe pixels in a second area of the image, and if insignificant changes in pixel intensity are observed in the second area, the processor moves the window back to the first area where significant changes in pixel intensity was observed, then tries moving the window in a vertical direction (or in other instances another direction different from the previous direction) to observe if significant changes in pixel intensity are still observed. The processor continues moving the window in a vertical direction and checking if significant changes in pixel intensity are still observed, and at each instance of moving the window in a vertical direction the processor moves the window in a horizontal direction to check if there are significant changes in pixel intensity in the horizontal direction as well. If significant changes in pixel intensity are observed in only one direction (e.g., horizontal or vertical direction), the processor identifies an edge. If significant changes in pixel intensity are observed in two or more directions, the processor identifies a corner (e.g., horizontal and vertical directions). The directions described herein are exemplary and used to explain the concept of identifying edges and corners. In other embodiments, other directions can be used and the order of steps described can be different.

In some embodiments, the processor determines the change in pixel color intensity by determining entropy within a particular area of an image wherein high entropy signifies large changes in pixel intensity within the particular area. If there are no changes or very small changes in pixel intensity within the particular area of the image then the entropy is very close to a value of zero. In some embodiments, the processor determines change in pixel color intensity by mapping pixel intensities of pixels within a particular area of an image to a continuous function and determining the derivative of that function. With the derivative being the slope, a derivative of zero is indicative of no change in pixel intensity while a derivative approaching one is indicative of a large change in pixel intensity. In some embodiments, the processor uses other methods such as Haar or Canny to detect features and objects.

In some embodiments, the processor extracts doorway features in the captured image using methods such as those described in 62/613,005, 62/616,928, and Ser. No. 15/614, 284, the entire contents of which are hereby incorporated by reference.

In some embodiments, the processor identifies the locations captured in an image by matching extracted objects and features of the captured image with objects and features in the map of the environment by comparing pixel intensity values of the objects and features. For example, the processor compares groups of pixels of different objects having similar pixel color intensities that were extracted from the captured image using thresholding with groups of pixels of objects in the map having similar pixel color intensities and identifies a match when (e.g., during evaluation a plurality of candidate matches) a number of consecutive pixel color intensities (e.g., adjacent in pixel space) are equal or similar, to within a tolerance range of one another (e.g., determined to correspond based on similarity of the values). In some embodiments, the processor identifies the locations captured in an image by matching extracted objects and features of the captured image with objects and features in the map of the environment by aligning objects and features. For example, the processor identifies the locations captured in an image within a map of the environment by aligning features such as edges, corners, doorways, etc. extracted using the extraction methods described above with edges, corners, doorways, etc. in the map. In some embodiments, the processor aligns edges, corners, doorways, etc. of the captured image with edges, corners, doorways, etc. in the map, and if they match, the processor checks if other objects extracted from the image also align with similar objects in the map. In some embodiments, the processor further compares pixel intensity values of aligned objects and features to verify they match.

In some instances, the processor identifies the locations captured in an image by matching extracted objects and features of the captured image with objects and features in the map of the environment using convolution. Some embodiments implement a kernel function that determines an aggregate measure of differences (e.g., a root mean square value) between some or all of a collection of adjacent pixels in the captured image relative to a particular area of the map to which the kernel function is applied. Some embodiments then determine the convolution of this kernel function over the particular area of the map, e.g., in some cases with a stride of greater than one pixel value. Some embodiments then select a minimum value of the convolution as a match that aligns the portion of the captured image from which the kernel function was formed with the particular area of the map to which the convolution was applied. In some embodiments, a point to point distance metric minimization technique or other similar mathematical method is used to find closest match between the captured image and an area of the map. In some embodiments, the processor uses scan matching techniques wherein optimization algorithms, such as Gauss-Newton or Levenberg-Marquardt, are used to find the best match between the captured image and an area within the map by minimizing the error between the data of the captured image and the map. In some embodiments, the processor uses a metric, such as the Szymkiewicz-Simpson coefficient, to indicate how good of a match there is between the captured image and a particular area of the map. In some embodiments, the processor matches objects and features of the captured image with objects and features of a particular area within the map using more than one approach to improve accuracy of the match.

In some instances where linear algebra is used, Basic Linear Algebra Subprograms (BLAS) are implemented to carry out operations such as vector addition, vector norms, scalar multiplication, matrix multiplication, matric transpose, matrix-vector multiplication, linear combinations, dot products, cross products, and the like.

Some embodiments down-res images to afford faster matching, e.g., by selecting every other, every fifth, or more or fewer pixel vectors, or by averaging adjacent pixel vectors to form lower-resolution versions of the image and map to be matched. The resulting alignment may then be applied to align the higher resolution image and map.

In some embodiments, the processor scales the captured images and compares the scaled images with different areas within the map of the environment to identify similar features and the location captured in the image. In some embodiments, the processor compares several variations of each image and several variations of the map. In some embodiments, the processor assigns a probability of the image and a particular area of the map matching. In some embodiments, the processor selects the match having highest probability of matching. In some embodiments, the processor continuously considers different matches over time as more data is collected and may determine that the captured image has a higher probability of matching a different area of the map than the initially chosen matching area of the map. In some embodiments, the processor discards matches having a probability of matching below a predetermined threshold. In some embodiments, the processor of the robotic device transmits potential matches to the application of the communication device and a user confirms or denies the suggested match.

In some embodiments, the processor of the robotic device compares images received from the application of the communication device to images of the environment stored in a memory of the robotic device to determine the location of the environment captured in the received images. In some embodiments, the application of the communication device transmits a recorded or streams a real-time video of the environment to the processor of the robotic device and the processor analyzes frames from the video to determine the location of the environment captured in the video within the map of the environment. In some embodiments, the processor uses a video capturing a succession of different locations within the environment to determine a path of the robotic device that follows the same succession of the locations captured in the video. In some embodiments, the processor saves the path of the robotic device for future use.

In some embodiments, a first portion of operations, such as those described above, are executed by the application of the communication device and a second portion of the operations are executed by the processor of the robotic device. For example, in some embodiments, the application of the communication device has access to the map of the environment and performs at least some of the operations, such as those described above, and transmits the information to the processor of the robotic device. In some embodiments, the processor instructs the robotic device to execute a particular action based on the received information. In some embodiments, at least a portion of operations, such as those described above, are off-loaded to an external processor.

In some embodiments, the processor of the robotic device receives images or videos captured from other imaging devices, such as imaging devices fixed in the environment for monitoring and security purposes (e.g., closed circuit TV) or imaging devices of other robotic devices.

In some embodiments, the map of the environment is, for example, a map of a room, a house, a commercial building, a stadium, a city, a state, or another area. In some embodiments, the method described above is used to instruct a robotic device to navigate to and/or service a particular area of the environment. For instance, the application of the communication device transmits captured images of a bedroom to a robotic floor-cleaning device, and using the operations described above, the processor of the robotic floor-cleaning device identifies the location of the bedroom captured in the received images within a stored map of the house and instructs the robotic floor-cleaning device to navigate to the room and clean the floor. For example, the application of the communication device transmits captured images of a house to a robotic taxi, and using the operations described above, the processor of the robotic taxi identifies the location of the house captured in the received images within a stored map of the city and instructs the robotic taxi to navigate to the house to pick up a passenger. In another example, the application of the communication device transmits captured images of a bush fire to a robotic fire truck, and using the operations described above, the processor of the robotic fir truck identifies the location of the brush fire captured in the received images in a stored map of the city and instructs the robotic fire truck to navigate to the brush fire and put it out. Other applications can include robotic tow truck services, robotic car rental services, and robotic delivery services.

In some embodiments, the processor of the robotic device creates a map of the environment using mapping methods such as those described in U.S. patent application Ser. Nos. 16/048,179, 16/048,185, 16/163,541, 16/163,562, 16/163, 508 and 62/614,449, the entire contents of which are hereby incorporated by reference. For instance, some of the embodiments introduced herein provide a computationally inexpensive mapping solution (or portion thereof) with minimal (or reduced) cost of implementation relative to traditional techniques. In some embodiments, mapping an environment may constitute mapping an entire environment, such that all areas of the environment are captured in the map. In other embodiments, mapping an environment may constitute mapping a portion of the environment where only some areas of the environment are captured in the map. For example, a portion of a wall within an environment captured in a single field of view of a camera and used in forming a map of a portion of the environment may constitute mapping the environment. Embodiments afford a method and apparatus for combining perceived depths to construct a floor plan of an environment using cameras capable of perceiving depths (or capable of acquiring data by which perceived depths are inferred) to objects within the environment, such as but not limited to (which is not to suggest that any other list herein is limiting), depth cameras or stereo vision cameras or depth sensors comprising, for example, an image sensor and IR illuminator. A charge-coupled device (CCD) or complementary metal oxide semiconductor (CMOS) camera positioned at an angle relative to a horizontal plane combined with at least one infrared (IR) point or line generator or any other structured form of light may also be used to perceive depths to obstacles within the environment. Objects may include, but are not limited to, articles, items, walls, boundary setting objects or lines, furniture, obstacles, etc. that are included in the floor plan. A boundary of a working environment may be considered to be within the working environment. In some embodiments, a camera is moved within an environment while depths from the camera to objects are continuously (or periodically or intermittently) perceived within consecutively overlapping fields of view. Overlapping depths from separate fields of view may be combined to construct a floor plan of the environment.

In some embodiments a camera, installed on a robotic device with at least one control system, for example, perceives depths from the camera to objects within a first field of view, e.g., such that a depth is perceived at each specified increment. Depending on the type of depth perceiving device used, depth may be perceived in various forms. The depth perceiving device may be a depth sensor, a camera, a camera coupled with IR illuminator, a stereovision camera, a depth camera, a time-of-flight camera or any other device which can infer depths from captured depth images. A depth image can be any image containing data which can be related to the distance from the depth perceiving device to objects captured in the image. For example, in one embodiment the depth perceiving device may capture depth images containing depth vectors to objects, from which the Euclidean norm of each vector can be calculated, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another embodiment, the depth perceiving device infers depth of an object based on the time required for a light (e.g., broadcast by a depth-sensing time-of-flight camera) to reflect off of the object and return. In a further example, the depth perceiving device may comprise a laser light emitter and two image sensors positioned such that their fields of view overlap. Depth may be inferred by the displacement of the laser light projected from the image captured by the first image sensor to the image captured by the second image sensor (see, U.S. patent application Ser. No. 15/243,783, which is hereby incorporated by reference). The position of the laser light in each image may be determined by identifying pixels with high brightness (e.g., having greater than a threshold delta in intensity relative to a measure of central tendency of brightness of pixels within a threshold distance). The control system may include, but is not limited to, a system or device(s) that perform, for example, methods for receiving and storing data; methods for processing data, including depth data; methods for processing command responses to stored or processed data, to the observed environment, to internal observation, or to user input; methods for constructing a map or the boundary of an environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used. An example of a control system is described below with reference to FIG. 8.

The robot and attached camera may rotate to observe a second field of view partly overlapping the first field of view. In some embodiments, the robot and camera may move as a single unit, wherein the camera is fixed to the robot, the robot having three degrees of freedom (e.g., translating horizontally in two dimensions relative to a floor and rotating about an axis normal to the floor), or as separate units in other embodiments, with the camera and robot having a specified degree of freedom relative to the other, both horizontally and vertically. For example, but not as a limitation (which is not to imply that other descriptions are limiting), the specified degree of freedom of a camera with a 90 degrees field of view with respect to the robot may be within 0-180 degrees vertically and within 0-360 degrees horizontally. Depths may be perceived to objects within a second field of view (e.g., differing from the first field of view due to a difference in camera pose). The depths for the second field of view may be compared to those of the first field of view. An area of overlap may be identified when a number of consecutive depths from the first and second fields of view are similar, as determined with techniques like those described below. The area of overlap between two consecutive fields of view correlates with the angular movement of the camera (relative to a static frame of reference of a room) from one field of view to the next field of view. By ensuring the frame rate of the camera is fast enough to capture more than one frame of measurements in the time it takes the robotic device to rotate the width of the frame, there is always overlap between the measurements taken within two consecutive fields of view. The amount of overlap between frames may vary depending on the angular (and in some cases, linear) displacement of the robotic device, where a larger area of overlap is expected to provide data by which some of the present techniques generate a more accurate segment of the floor plan relative to operations on data with less overlap. In some embodiments, a control system infers the angular disposition of the robot from the size of the area of overlap and uses the angular disposition to adjust odometer information to overcome the inherent noise of the odometer. Further, in some embodiments, it is not necessary that the value of overlapping depths from the first and second fields of view be the exact same for the area of overlap to be identified. It is expected that measurements will be affected by noise, resolution of the equipment taking the measurement, and other inaccuracies inherent to measurement devices. Similarities in the value of depths from the first and second fields of view can be identified when the values of the depths are within a tolerance range of one another. The area of overlap may also be identified by recognizing matching patterns among the depths from the first and second fields of view, such as a pattern of increasing and decreasing values. Once an area of overlap is identified, in some embodiments, it is used as the attachment point and the two fields of view are attached to form a larger field of view. Since the overlapping depths from the first and second fields of view within the area of overlap do not necessarily have the exact same values and a range of tolerance between their values is allowed, the overlapping depths from the first and second fields of view are used to calculate new depths for the overlapping area using a moving average or another suitable mathematical convolution. This is expected to improve the accuracy of the depths as they are calculated from the combination of two separate sets of measurements. The newly calculated depths are used as the depths for the overlapping area, substituting for the depths from the first and second fields of view within the area of overlap. The new depths are then used as ground truth values to adjust all other perceived depths outside the overlapping area. Once all depths are adjusted, a first segment of the floor plan is complete. This method may be repeated such that the camera perceives depths (or pixel intensities indicative of depth) within consecutively overlapping fields of view as it moves, and the control system identifies the area of overlap and combines overlapping depths to construct a floor plan of the environment.

In some embodiments, the information sensed by the sensor may be processed and translated into depth measurements, which, in some embodiments, may be reported in a standardized measurement unit, such as millimeter or inches, for visualization purposes, or may be reported in non-standard units. Depth may be inferred (or otherwise perceived) in various ways. For example, depths may be inferred based (e.g., exclusively based on or in combination with other inputs) on pixel intensities from a depth image captured by a depth camera. Depths may be inferred from the time it takes for an infrared light (or sound) transmitted by a sensor to reflect off of an object and return back to the depth perceiving device or by a variety of other techniques. For example, using a time-of-flight camera, depth may be estimated based on the time required for light transmitted from a robot to reflect off of an object and return to a camera on the robot, or using an ultrasonic sensor, depth may be estimated based on the time required for a sound pulse transmitted from a robot-mounted ultrasonic transducer to reflect off of an object and return to the sensor. In some embodiments, a one or more infra-red (IR) (or with other portions of the spectrum) illuminators (such as those mounted on a robot) may project light onto objects (e.g., with a spatial structured pattern (like with structured light), or by scanning a point-source of light), and the resulting projection may be sensed with one or more cameras (such as robot-mounted cameras offset from the projector in a horizontal direction). In resulting images from the one or more cameras, the position of pixels with high intensity may be used to infer depth (e.g., based on parallax, based on distortion of a projected pattern, or both in captured images). In some embodiments, raw data (e.g., sensed information from which depth has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units.

In embodiments, raw data may be provided in matrix form or in an ordered list (which is not to suggest that matrices cannot be encoded as ordered lists in program state). When the raw data of the sensor are directly used by an AI algorithm, these extra steps may be bypassed and raw data may be directly used by the algorithm, where raw values and relations between the raw values are used to perceive the environment and construct the map directly without converting raw values to depth measurements with metric or imperial units prior to inference of the map (which may include inferring or otherwise perceiving a subset of a map, like inferring a shape of a piece of furniture in a room that is otherwise mapped with other techniques). For example, in embodiments, where at least one camera coupled with at least one IR laser is used in perceiving the environment, depth may be inferred based on the position and/or geometry of the projected IR light in the image captured. For instance, some embodiments may infer map geometry (or features thereof) with a trained convolutional neural network configured to infer such geometries from raw data from a plurality of sensor poses. Some embodiments may apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments may include three, five, ten, or more such stages trained on progressively finer-grained residual differences relative to outputs of earlier stages in the model pipeline. In some cases, objects may be detected and mapped with, for instance, a capsule network having pose invariant representations of three dimensional objects. In some cases, complexity of exploiting translational invariance may be reduced by leveraging constraints where the robot is confined to two dimensions of movement, and the output map is a two dimensional map, for instance, the capsules may only account for pose invariance within a plane. A digital image from the camera may be used to detect the position and/or geometry of IR light in the image by identifying pixels with high brightness (or outputs of transformations with high brightness, like outputs of edge detection algorithms). This may be used directly in perceiving the surroundings and constructing a map of the environment. The raw pixel intensity values may be used to determine the area of overlap between data captured within overlapping fields of view in order to combine data and construct a map of the environment. In the case of two overlapping images, the area in which the two images overlap contain similar arrangement of pixel intensities in at least a portion of the digital image. This similar arrangement of pixels may be detected and the two overlapping images may be stitched at overlapping points to create a segment of the map of the environment without processing the raw data into depth measurements. An example of this process is illustrated in FIGS. 9A and 9B and FIGS. 10A-10C and is described in further detail below.

As a further example, raw time-of-flight data measured for multiple points within overlapping fields of view may be compared and used to find overlapping points between captured data without translating the raw times into depth measurements, and in some cases, without first triangulating multiple depth measurements from different poses to the same object to map geometry of the object. The area of overlap may be identified by recognizing matching patterns among the raw data from the first and second fields of view, such as a pattern of increasing and decreasing values. Matching patterns may be detected by using similar methods as those discussed herein for detecting matching patterns in depth values perceived from two overlapping fields of views. This technique, combined with the movement readings from the gyroscope or odometer and/or the convolved function of the two sets of raw data can be used to infer a more accurate area of overlap in some embodiments. Overlapping raw data may then be combined in a similar manner as that described above for combing overlapping depth measurements. Accordingly, some embodiments do not require that raw data collected by the sensor be translated into depth measurements or other processed data (which is not to imply that "raw data" may not undergo at least some processing between when values are sensed by a sensor and when the raw data is subject to the above techniques, for instance, charges on charge-coupled image sensors may be serialized, normalized, filtered, and otherwise transformed without taking the result out of the ambit of "raw data").

In some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

In other embodiments, the boustrophedon movement pattern (or other coverage path pattern) of the robotic device during the mapping process differs. For example, in some embodiments, the robotic device is at one end of the environment, facing towards the open space. From here, the robotic device moves in a first forward direction (from the perspective of the robot as defined above) by some distance then rotates 90 degrees in a clockwise direction. The processor determines the first forward distance by which the robotic device travels forward by detection of an obstacle by a sensor, such as a wall or furniture. In some embodiments, the first forward distance is predetermined (e.g., and measured by another sensor, like an odometer or by integrating signals from an inertial measurement unit). The robotic device then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robotic device returns back towards the area it began from, the surface being cleaned overlaps with the surface that was already cleaned. In some cases, this may be desirable. If the distance is too large (e.g., greater than the width of the main brush)

some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. The robotic device then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robotic device repeatedly makes two 90-degree turns separated by some distance before travelling in the opposite direction, such that movement of the robotic device is a boustrophedon pattern, travelling back and forth across the environment. In other embodiments, the directions of rotations are opposite to what is described in this exemplary embodiment. In some embodiments, the robotic device may not be initially facing a wall of which it is in close proximity. The robotic device may begin executing the boustrophedon movement pattern from any area within the environment. In some embodiments, the robotic device performs other movement patterns besides boustrophedon alone or in combination.

In some embodiments, the processor stores the map of the environment in a memory of the robotic device. In some embodiments, an application of a communication device is used to create a map of the environment using methods such as those described in U.S. Patent Application No. 62/681,965, the entire contents of which are hereby incorporated by reference.

In some embodiments, the robotic device is paired with the application of the communication device using pairing methods such as those described in U.S. patent application Ser. No. 16/109,617.

In some embodiments, the robotic device includes one or more autonomous or semi-autonomous devices including communication, an actuator, mobility, and/or processing components. For example, the robotic device may include a casing (like a shell), a chassis, a set of wheels, a suspension system, a motor configured to drive the wheels, a receiver that acquires signals, a transmitter that transmits signals, a processor, a storage medium, a controller, network (e.g., wireless) communications, power management (like a battery), USB ports etc., and one or more clock or synchronizing device. In addition, the robotic device may include a mapping module, localization module, path planning module, user interface module, scheduling module, and various sensors. Examples of sensors include tactile sensors, depth sensors such as LDS, time-of-flight sensors, depth cameras, movement sensors, such as an odometer, inertial measurement units (like with a three-axis accelerometer and a three-axis gyroscope), optical flow sensors (e.g., a visual odometry sensor facing the ground), and other types of sensors useful to the functionality of the robotic device. The list of components presented is not meant to be an exhaustive list of possible components of the robotic device but is rather an example of possible components the robotic device may have. Components and modules may be separate and combined with the main processor of the robotic device or may be integrated within the main processor of the robotic device. Other types of robotic devices with other configurations may also be used.

FIG. 1 illustrates a flowchart describing some embodiments of a method including steps 101-106 for identifying a particular location of an environment captured in an image within a map of the environment and directing a robotic device to navigate to that location.

Figures 2D, 2E, 2F:
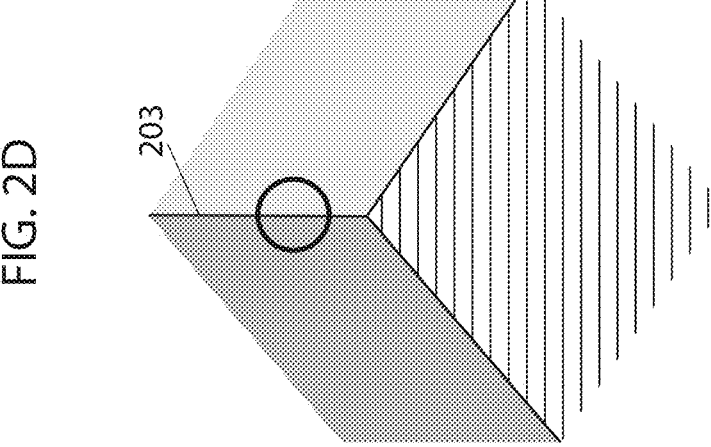

FIG. 2 illustrates an example of how a corner is detected by a processor of a robotic device. The process begins with the processor considering area 200 on wall 201 captured in an image and observing the changes in pixel color intensity of the pixels in area 200 as shown in FIG. 2A. After observing insignificant changes in pixel color intensity, the processor moves on to considering area 202 in the capturing image containing edge 203 joining walls 201 and 204 and observes large changes in pixel color intensity in the pixels along edge 203 as illustrated in FIG. 2B. In FIG. 2C the processor moves on to consider another area 205 on wall 204 to the right of area 202 and observes no changes in pixel color intensity. In FIG. 2D the processor returns back to area 202 containing edge 203 where large changes in pixel intensity were observed, then considers area 206 above area 202 as shown in FIG. 2E and observes changes in pixel color intensity along edge 203. Finally, in FIG. 2F the processor moves to consider area 207 below area 202 with edges 203 and 208 joining walls 201 and 204 and floor 209. The processor observes changes in pixel color intensity along edge 203 and along edge 208. Upon discovering changes in pixel color intensity in two directions along both edges 203 and 208, a corner is identified. Upon discovering changes in pixel color intensity in one direction, an edge is identified.

Figure 3:
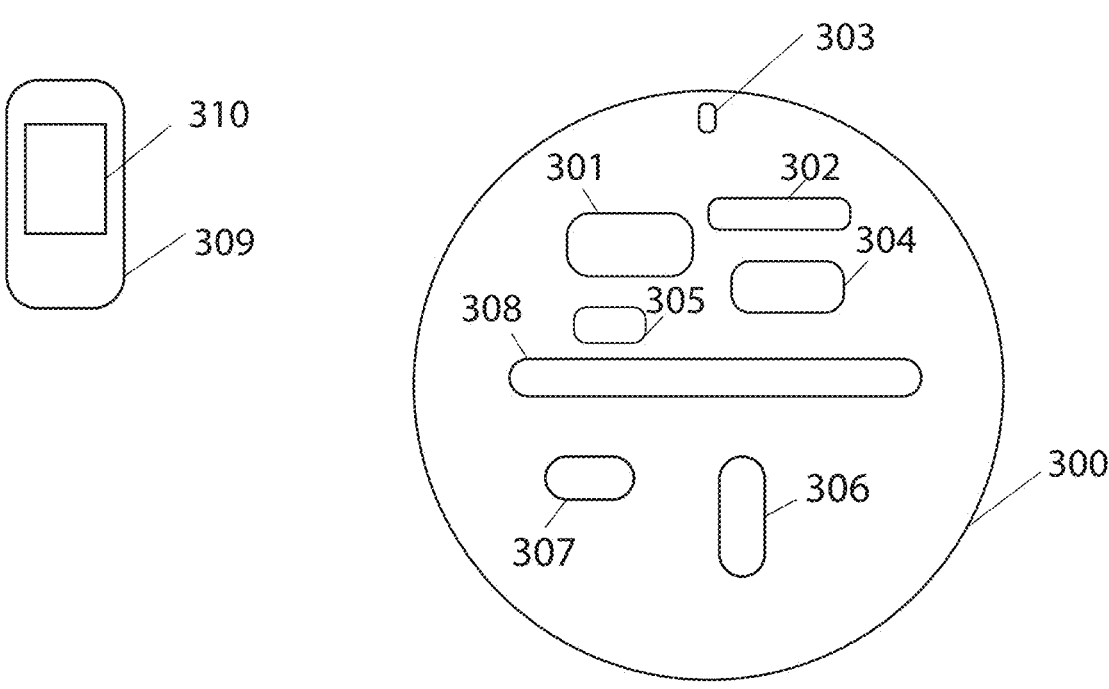
FIG. 3 illustrates an example of a robotic device and communication device that may be used to execute at least some of the techniques described herein in some embodiments.

FIG. 3 illustrates an example of a robotic device 300 with processor 301, memory 302, a first set of sensors 303, second set of sensors 304, network communications 305, movement driver 306, timer 307, and one or more cleaning tools 308. The first and second set of sensors 303 and 304 may include depth measuring devices, movement measuring devices, and the like. In some embodiments, the robotic device may include the features of a robotic device described herein. The shape of the illustrated features is not meant to imply that the robot has a round shape or that any feature has any particular shape. In some embodiments, program code stored in the memory 302 and executed by the processor 301 may effectuate the operations described herein. Some embodiments additionally include communication device 309 having a touchscreen 310 on which an application of the communication device is executed.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A system, comprising:
a robot, comprising:
a chassis;

a plurality of sensors;
a processor; and
a tangible, non-transitory, machine-readable medium storing instructions that, when executed by the processor of the robot, effectuates operations comprising:
capturing, with an image sensor disposed on the robot, images of an environment of the robot;
extracting, with the processor of the robot, features from the captured images by obtaining, with the processor of the robot, raw pixel intensity values of the captured images, wherein features in the captured images are extracted from raw pixel intensity values;
generating, with the processor of the robot, a map of the environment of the robot at least partly based on the features in the captured images;
associating, with the processor of the robot, areas within the map of the environment with subareas of the environment from which images were captured; and
actuating, with the processor of the robot, the robot to execute work in the environment based on the generated map of the environment within at least a particular sub area or labeled area of the environment upon receiving, with the processor of the robot, at least one voice command comprising an instruction for executing work within the at least particular sub area or labeled area;
a set of instructions and executable code that, when executed by a processor of an external communication and computing device, effectuates operations comprising:
pairing the external communication and computing device with the processor of the robot to communicate with the robot;
receiving the map of the environment created by the robot;
displaying the map of the environment of the robot; and
receiving at least one input designating an instruction for the robot in relation to the at least one subarea within the environment by:
accessing the camera of the communication and computing device for capturing images of the environment;
capturing an image of the environment;
displaying the image; and
receiving at least one input in relation to the displayed image.

2. The system of claim 1, wherein the robot executes the instruction according to the virtual boundary.

3. A system, comprising:
a robot, comprising:
a chassis;
a plurality of sensors;
a processor; and
a tangible, non-transitory, machine-readable medium storing instructions that, when executed by the processor, effectuates operations comprising:
capturing, with an image sensor disposed on the robot, a plurality of images of an environment of the robot;
extracting, with the processor of the robot, at least one feature from the captured plurality of images by obtaining, with the processor of the robot, raw pixel intensity values of the captured images, wherein features in the images are extracted from raw pixel intensity values;

generating, with the processor of the robot, a map of the environment based on at least the plurality of images and the extracted features;

actuating, with the processor of the robot, the robot to execute work in the environment based on the generated map within at least a particular sub area or labeled area of the environment upon receiving, with the processor of the robot, at least one voice command comprising an instruction for executing work within the at least particular sub area or labeled area;

a set of instructions and executable code that, when executed by a processor of an external communication and computing device, effectuates operations comprising:

pairing the external communication and computing device with the processor of the robot to communicate with the robot;

receiving the map of the environment created by the robot;

display the map of the environment of the robot;

receiving at least one input designating an instruction for the robot in relation to the at least one subarea within the environment based on the map of the environment by:

accessing the camera of the communication and computing device for capturing images of the environment;

capturing an image of the environment;

displaying the image; and receiving at least one input in relation to the displayed image.

4. The system of claim 3, wherein the instruction for the robot comprises avoiding the at least one subarea.

5. The system of claim 3, wherein the operations further comprise:

collecting, with at least one debris sensor disposed on the robot, a plurality of debris data of the environment;

associating, with the processor of the robot, each debris data with a location of the environment from which the respective debris data was collected; and inferring, with the processor of the robot, locations of the environment with debris accumulation based on the plurality of debris data.

6. The system of claim 5, wherein the operations further comprise:

adjusting, with the processor of the robot, a coverage path of the robot based on the locations of the environment with debris accumulation.

7. The system of claim 3, wherein the operations further comprise:

generating, with the processor of the robot, a first movement path covering at least part of the environment;

actuating, with the processor of the robot, the robot to move along the first movement path, wherein actuating the robot to move along at least a portion of the first movement path comprises a repetitive iteration of:

actuating, with the processor of the robot, the robot to traverse a first linear segment;

actuating, with the processor of the robot, the robot to rotate 180 degrees in a first rotation, wherein the first rotation comprises traversing a distance in a direction perpendicular to the first linear segment after starting the first rotation and before finishing the first rotation;

actuating, with the processor of the robot, the robot to traverse a second linear segment; and actuating, with the processor of the robot, the robot to rotate 180 degrees in a second rotation, wherein the second rotation comprises traversing the distance in a direction perpendicular to the second linear segment after starting the second rotation and before finishing the second rotation.

8. The system of claim 7, wherein the distance is less than a coverage width of the robot.

9. The system of claim 3, wherein:

the robot further comprises a main brush and a peripheral brush;

the peripheral brush comprises a plurality of arms; and at least one arm of the peripheral brush comprises bristles extending from the respective arm, the bristles being secured to the at least one arm and one another with stitching to prevent the bristles from being forcibly plucked during operation of the robot.

10. The system of claim 9, wherein the bristles are secured to the at least one arm and one another using one or more of the following techniques: stitching at least one line across the bristles, stitching two lines in opposite directions diagonally across the width of the bristles, or stitching a crisscross pattern across the bristles.

11. The system of claim 10, wherein:

the at least one stitched line across the bristles is in a direction perpendicular to the length of the bristles; and the stitched crisscross pattern across the bristles is in a direction perpendicular to the length of the bristles.

12. The system of claim 3, wherein generating the map of the environment comprises:

aligning, with the processor of the robot, data of respective images, wherein aligning comprises:

detecting a feature in the first image;

detecting the same feature in the second image; and determining alignment of data of the first image and data of the second image based on at least a position of the feature in the first and second images; and generating, with the processor of the robot, the map based on the alignment of the data of the first image and the data of the second image.

13. The system of claim 3, wherein the operations further comprise:

associating, with the processor of the robot, areas within the map of the environment with subareas of the environment from which images were captured.

14. The system of claim 3, wherein the robot performs the instruction upon detecting the at least the portion of the content in the captured image within the environment.

15. A tangible, non-transitory, machine-readable medium storing instructions that, when executed by a processor of a robot, effectuate operations comprising:

capturing, with an image sensor disposed on the robot, a plurality of images of an environment of the robot;

extracting, with the processor of the robot, at least one feature from the captured plurality of images by obtaining, with the processor of the robot, raw pixel intensity values of the captured images, wherein features in the images are extracted from raw pixel intensity values;

generating, with the processor of the robot, a map of the environment of the robot at least partly based on the captured plurality of images and the extracted features;

actuating, with the processor of the robot, the robot to execute work in the environment based on the generated map within at least a particular sub area or labeled area of the environment upon receiving, with the processor of the robot, at least one voice command comprising an instruction for executing work within the at least particular sub area or labeled area;

wherein a set of instructions and executable code that when executed by the processor of an external communication and computing device effectuates operations comprising:

pairing; the external communication and computing device with the processor of the robot to communicate with the robot;

receiving the map of the environment created by the robot;

displaying the map of the environment of the robot; and receiving at least one input designating an instruction for the robot in relation to at least a subarea within the map of the environment by:

accessing the camera of the communication and computing device for capturing images of the environment;

capturing an image of the environment;

displaying the image; and receiving at least one input in relation to the displayed image.

16. A method for operating a robot, comprising:

capturing, with an image sensor disposed on the robot, a plurality of images of an environment of the robot;

extracting, with a processor of the robot, at least one feature from the captured plurality of images by obtaining, with the processor of the robot, raw pixel intensity values of the captured images, wherein features in the images are extracted from raw pixel intensity values;

generating, with the processor of the robot, a map of the environment of the robot at least partly based on the features in the captured plurality of images and extracted features;

actuating, with the processor of the robot, the robot to execute work in the environment based on the generated map within at least a particular sub area or labeled area of the environment upon receiving, with the processor of the robot, at least one voice command comprising an instruction for executing work within the at least particular sub area or labeled area;

wherein a set of instructions and executable code that, when executed by the processor of an external communication and computing device, effectuates operations comprising:

pairing, the external communication and computing device with the processor of the robot to communicate with the robot;

receiving the map of the environment created by the robot;

displaying the map of the environment of the robot; and receiving at least one input designating an instruction for the robot in relation to at least a subarea within the map of the environment based on the map of the environment by:

accessing the camera of the communication device and computing device for capturing images of the environment;

capturing an image of the environment;

displaying the image; and receiving at least one input in relation to the displayed image.

* * * * *